(12) United States Patent
Sauter et al.

(10) Patent No.: US 6,810,317 B2
(45) Date of Patent: Oct. 26, 2004

(54) SYSTEM AND METHOD FOR CONTROLLING AND/OR REGULATING THE HANDLING CHARACTERISTICS OF A MOTOR VEHICLE

(75) Inventors: Thomas Sauter, Remseck (DE); Andreas Zoebele, Markgroeningen (DE); Johannes Schmitt, Markgroeningen (DE); Hardy Haas, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/220,512

(22) PCT Filed: Dec. 22, 2001

(86) PCT No.: PCT/DE01/04908

§ 371 (c)(1),
(2), (4) Date: Dec. 9, 2002

(87) PCT Pub. No.: WO02/053433

PCT Pub. Date: Jul. 11, 2002

(65) Prior Publication Data

US 2003/0176961 A1 Sep. 18, 2003

(30) Foreign Application Priority Data

Dec. 30, 2000 (DE) .......................... 100 65 774

(51) Int. Cl.$^7$ ................................. G06F 7/00
(52) U.S. Cl. ............................ 701/70; 701/71; 701/72; 180/197
(58) Field of Search .................. 701/72, 70, 71, 701/82, 74, 78, 84, 90, 29, 35; 303/150, 171, 187, 133, 139, 141, 194, 195, 148, 122.03; 180/197, 179, 170, 233

(56) References Cited

U.S. PATENT DOCUMENTS

| | | | |
|---|---|---|---|
| 5,799,261 A | * | 8/1998 | Ozaki et al. ................. 701/78 |
| 5,879,061 A | * | 3/1999 | Koibuchi .................... 303/146 |
| 5,884,719 A | | 3/1999 | Schramm et al. ........... 180/197 |
| 6,023,649 A | * | 2/2000 | Matsuura et al. ............. 701/71 |
| 6,026,343 A | * | 2/2000 | Ogino ........................ 701/72 |
| 6,456,924 B1 | * | 9/2002 | Schmitt et al. ............... 701/82 |
| 6,564,138 B1 | * | 5/2003 | Schmitt et al. ............... 701/82 |
| 6,585,070 B1 | * | 7/2003 | Hessmert et al. ........... 180/197 |

FOREIGN PATENT DOCUMENTS

| | | |
|---|---|---|
| DE | 39 35 588 | 4/1991 |
| DE | 197 44 725 | 4/1999 |
| DE | 197 50 501 | 5/1999 |
| DE | 198 12 237 | 9/1999 |
| EP | 0 529 280 | 3/1993 |
| EP | 0 552 456 | 7/1993 |
| EP | 0 884 230 | 12/1998 |

* cited by examiner

Primary Examiner—Jacques H. Louis-Jacques
(74) Attorney, Agent, or Firm—Kenyon & Kenyon

(57) ABSTRACT

A system for controlling and/or regulating the driving response of a motor vehicle having at least two wheels includes at least one sensor device, which detects a wheel speed of at least two wheels, and further includes a data processing device, which determines at least one motion relationship of at least two wheels relative to one another according to the wheel speeds detected. As described, the data processing device establishes at least one cornering motion variable of the vehicle according to the at least one motion relationship determined. A corresponding method is also described.

35 Claims, 3 Drawing Sheets

SYSTEM AND METHOD FOR CONTROLLING AND/OR REGULATING THE HANDLING CHARACTERISTICS OF A MOTOR VEHICLE

FIELD OF THE INVENTION

The present invention relates to a system for controlling and/or regulating the driving response of a motor vehicle having at least two wheels, the system including: at least one sensor device, which detects wheel speeds of at least two wheels, and a data processing device, which determines at least one motion relationship of at least two wheels relative to one another according to the wheel speeds detected.

In addition, the present invention relates to a method of controlling and/or regulating the driving response of a motor vehicle having at least two wheels, implemented for example by the system according to the present invention, the method including the following steps: detecting wheel speeds of at least two wheels, and determining at least one motion relationship of at least two wheels according to the wheel speeds detected.

BACKGROUND INFORMATION

Conventional systems, such as TCS, ABS, and ESP, may regulate the driving response of a motor vehicle. As a rule, these systems intervene in the operating state of the vehicle on the basis of slip, i.e., the instantaneous wheel slip is monitored by sensors and kept in a favorable range by changing a driving torque which is output by the engine and/or by changing wheel brake pressures. As a rule, this range is one in which the greatest possible coefficient of friction between the wheel and the driving surface may be utilized.

In contrast to straight-ahead driving, errors may be made in establishing the actual wheel slip occurring during cornering due to differing wheel velocities of the individual vehicle wheels.

An error of this type occurs because an Ackermann condition is maintained in axle pivot steering. The Ackermann condition defines the position of the individual wheels of a motor vehicle during travel through curves and requires that the extended rotational axes of all wheels of a motor vehicle intersect in one point. This point is then the instantaneous pole around which the vehicle rotates. Since the rear wheels of a motor vehicle are, as a rule, not steerable, the instantaneous pole may be on an extension of the rotational axis of the rear wheels, which are arranged essentially coaxially. All wheels of the vehicle then have a different distance from the instantaneous pole and therefore have different wheel speeds and/or wheel velocities during travel through curves, from which devices which determine the wheel slip with reference to a comparison of wheel speeds of different wheels establish an apparent wheel slip without it actually existing.

In vehicles having front-wheel drive, too high a slip, i.e., positive slip, is recognized due to the geometrical slip, while in vehicles having rear-wheel drive, too low a slip, i.e., trailing slip, is recognized.

SUMMARY OF THE INVENTION

The present invention may be refined in relation to the above-described conventional systems in that the data processing device may establish at least one cornering motion variable of the vehicle according to at least one motion relationship determined.

This example embodiment of a system according to the present invention may allow precise establishment of the at least one cornering motion variable using low outlay for sensors. In this case, only wheel speeds are detected and the establishment of the at least one cornering motion variable is thus based on the actual conditions prevailing between the driving surface and the wheels. Using the present invention, methods for control and/or regulation of the driving response of the vehicle may be performed, for example, on the basis of the established cornering motion variable with greater precision than before.

A suitable motion relationship may be, for example, a speed differential between two wheels, such as between two wheels arranged at a distance from one another in the transverse vehicle direction, e.g. between two front wheels and/or between two rear wheels. From this speed differential it may be directly derived that the vehicle is cornering. In this case, the speed differential of the steered wheels in the steered state may be different from the speed differential of the unsteered wheels. Due to the proportionality between wheel speed and translational wheel velocity, the statements made above and in the following apply both for speeds and for translational wheel velocities, i.e., for the velocity of a wheel center point.

A yaw rate and/or a curve radius and/or a transverse acceleration and/or a geometrical slip of the vehicle may be established from such a speed differential as a cornering motion variable. The apparent slip described above which arises due to the Ackermann condition being observed is referred to as geometric slip.

To establish the speed differential between two wheels, according to an example embodiment of a system of the present invention, at least two wheels lying opposite one another in the transverse vehicle direction may each be assigned a sensor device. Additionally, for example, at least two wheels arranged one behind the other in the longitudinal vehicle direction, or every wheel of the vehicle, may likewise be assigned a sensor device. The more wheels assigned a sensor device of this type, the more precisely the at least one cornering motion variable may be established.

A tire sensor device and/or a wheel bearing sensor device may be considered as a suitable sensor device. These sensor devices may detect wheel speeds directly on the wheel and, in addition, are capable of detecting additional information about forces acting between wheel and driving surface. Of course, the wheel speed may be detected using a conventional speed sensor, such as one including a pulse ring and a sensor, such as that used in antilock braking systems. The present invention, by contrast, may require only one single type of sensor, namely a sensor detecting the wheel speed.

In order to be able to make the detected and/or established values available for processing, an example embodiment of system may include a memory device. Selected vehicle geometry data may be stored in this memory device, with reference to which, together with the wheel speeds detected, the at least one cornering motion variable may be established.

According to one example embodiment of the present invention, the data processing device may, according to the at least one cornering motion variable established, perform a correction of a motion variable, for example the vehicle velocity or a wheel slip, which is calculated from the wheel speeds detected.

In addition, the data processing device may output an actuating signal to enhance the traffic safety according to the cornering motion variable established, the example embodiment of the system further including an actuator which influences an operating state of the motor vehicle according to the actuating signal. Subsequently, the vehicle velocity may, for example, be regulated according to the yaw rate and/or the transverse acceleration established.

The number of components required for implementing the example embodiment of the system according to the present invention may be kept low if the data processing device and/or the actuator is/are assigned to a device for controlling and/or regulating the driving response of a motor vehicle, such as a TCS, an antilock braking system, or an ESP system.

The control and/or regulation of the driving response may be improved through a corresponding device in that the device for controlling and/or regulating the driving response of a motor vehicle selects control and/or regulation algorithms as a function of the at least one cornering motion variable established.

In one case, for example, the actuator may be assigned to a TCS and/or be part of a TCS which switches between traction-prioritized and driving stability-prioritized regulation as a function of the curve radius established, taking the vehicle velocity into consideration, for example. Therefore, for example, for small curve radii, regulation may be performed in such a manner that the highest possible traction is achieved, while for greater curve radii—and possibly at higher vehicle velocities—high driving stability is given priority.

In other words, the features of the present invention may be achieved through a system for controlling and/or regulating the driving response of a motor vehicle having at least one wheel, the geometrical slip and/or the curve radius and/or the yaw rate of the vehicle being established from the wheel motion behavior detected.

The present invention may also include a step of establishing at least one cornering motion variable of the vehicle according to the motion relationship determined. Using an example method according to the present invention, the features cited above in connection with an example embodiment of the system according to the present invention may also be achieved, for which reason reference is expressly made to the description of the system according to the present invention for supplementary explanation of the example method.

As previously explained, to establish the at least one cornering motion variable a speed differential between two wheels is determined as a motion relationship. This may be a speed differential between two wheels arranged at a distance from one another in the transverse vehicle direction, such as, for example, between the front wheels and/or between the rear wheels.

The at least one cornering motion variable may be precisely established if the wheel speed of as many vehicle wheels as possible is detected, such as, for example, all of them.

A yaw rate of the vehicle may be calculated particularly easily as a cornering motion variable from a speed differential between two wheels arranged at a distance from one another in the transverse vehicle direction. For this purpose, only knowledge about the geometrical ratios of the vehicle may be additionally required. This information may be stored in a memory device. Furthermore, a curve radius may be established as a cornering motion variable with the aid of the yaw rate. To establish the curve radius, it may be, for example, sufficient to know an average velocity of non-driven wheels and the yaw rate, since the average velocity of non-driven wheels may be calculated from corresponding wheel speeds of these wheels through averaging. In some circumstances, the curve radius may be established directly from the speeds of the vehicle wheels while taking the Ackermann condition or the track width into consideration is also conceivable. A transverse acceleration of the vehicle may also be established as a cornering motion variable from the average velocity of non-driven wheels and the yaw rate.

In addition, as previously described in connection with an example embodiment of the system according to the present invention, the geometrical slip of the vehicle produced by observing the Ackerman condition during cornering may be established as a cornering motion variable. If this apparent slip is known, variables derived from the wheel speeds, such as vehicle velocity and wheel slip, may be corrected appropriately and determined more precisely. Furthermore, the established geometrical wheel slip of the wheels on the inside of the curve may be taken into consideration for the slip threshold calculation of slip-based control and/or regulation devices and the precision of the control and/or regulation may be enhanced in this manner. These types of devices may be, for example, antilock braking systems, TCS, and/or ESP systems.

The geometrical slip of the wheels on the outside of the curve may be used as a gauge for the possible lateral traction of the vehicle during cornering and, in addition, may be taken into consideration for an SDOC determination. The abbreviation SDOC stands for "system deviation outside curve" in this case.

More extensive information on the precise establishment of the cornering motion variables cited is given further below in connection with the description of the figures.

DETAILED DESCRIPTION

Figure 1:
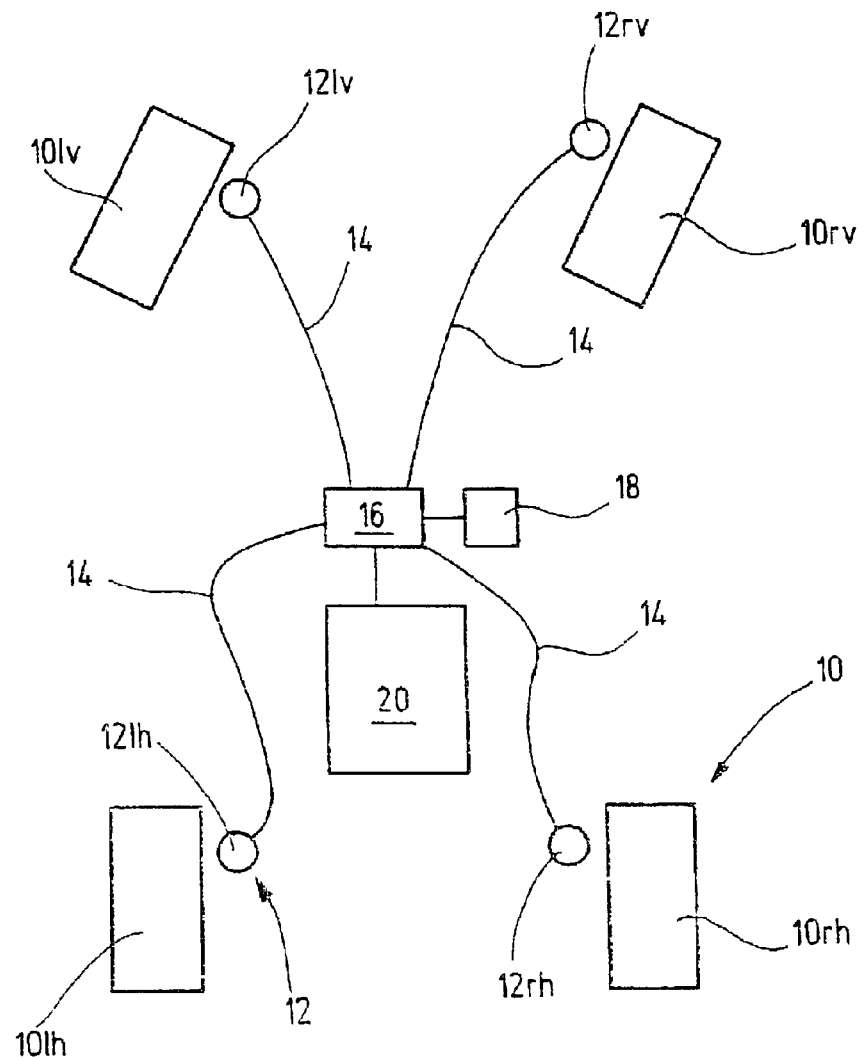
FIG. 1 shows a block diagram of an example embodiment of a system according to the present invention.

FIG. 1 shows a block diagram of an example embodiment of a system according to the present invention. Each wheel 10 is assigned a wheel speed sensor device 12 in this case. Reference number 10 of the wheels is provided with two identifying letters to identify the position of the respective wheel on the vehicle. In this case, l means left, r right, f front, and b rear. Sensor devices 12 assigned to wheels 10 are identified in the same manner.

Sensor devices 12 are connected via data lines 14 to a data processing device 16. Data processing device 16 is in turn connected to a memory device 18 and a TCS 20 for data transmission.

Front wheels 10*lf* and 10*rf* are steerable in the example illustrated, rear wheels 10*lb* and 10*rb* are not. Sensor devices 12 detect the speeds of respective wheels 10 assigned to them and supply corresponding signals to data processing device 16 via data lines 14. Data processing device 16 calculates an average translational wheel velocity of the non-driven wheels from the wheel speeds of the non-driven wheels. Data processing device 16 additionally reads vehicle geometry data from memory device 18 and, on the basis of this geometry data and on the basis of wheel velocity information, establishes an instantaneous yaw rate, a curve radius of the curved road instantaneously traversed, a transverse acceleration, and a geometrical slip of the wheels on the inside of the curve and the wheels on the outside of the curve. The calculated variables cited above are finally stored by data processing device 16 in memory device 18, where they are available to TCS 20.

Sensor devices 12 may be part of the TCS, which may have wheel speed sensors available for slip-based regulation in any case. Data processing device 16 and memory device 18 may also be part of TCS 20.

Instead of a TCS, device 20 may also be another slip-based system for controlling or regulating driving response, such as an ESP system or an antilock braking system.

Figure 2:
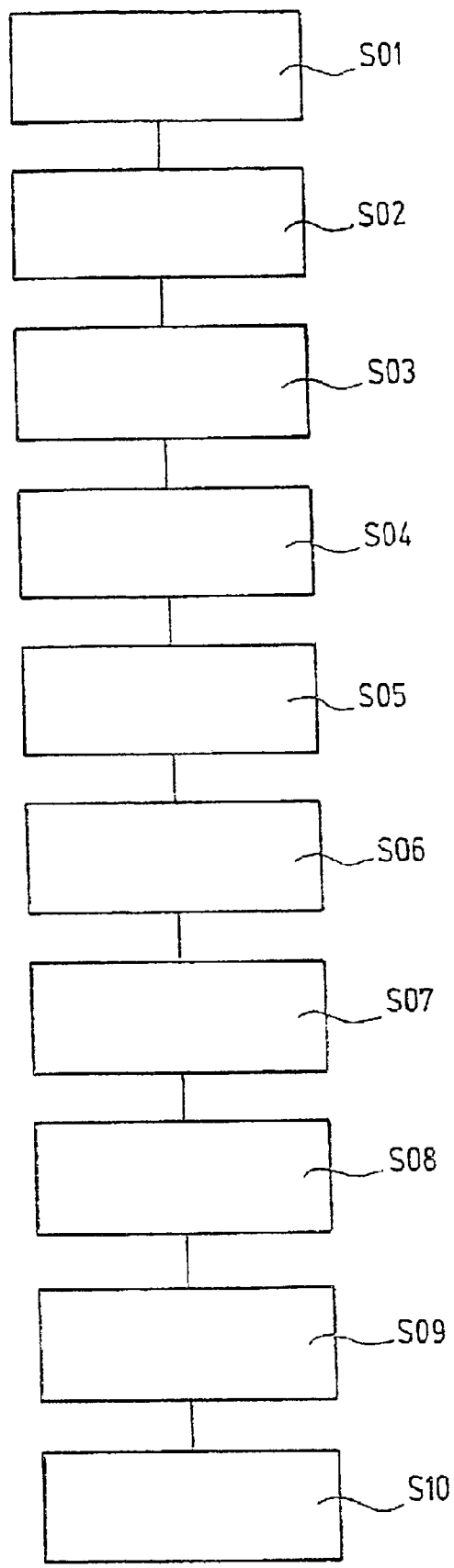
FIG. 2 shows a flowchart of an example method according to the present invention for establishing cornering motion variables of the vehicle.

FIG. 2 shows a flowchart of an example embodiment of a method according to the present invention in the scope of the present invention, the wheel speeds of the individual wheels being detected and cornering motion variables being established therefrom. First, the meaning of the individual steps will be indicated:

- S01: Detecting an instantaneous wheel speed of each wheel.
- S02: Establishing an average wheel velocity of the non-driven wheels.
- S03: Establishing a differential velocity of the non-driven wheels.
- S04: Establishing an instantaneous yaw rate of the vehicle.
- S05: Establishing an instantaneous transverse acceleration.
- S06: Establishing a curve radius of the curved road instantaneously traversed.
- S07: Establishing a wheel slip.
- S08: Establishing a geometrical slip for the wheels on the inside of the curve and the wheels on the outside of the curve.
- S09: Correcting the wheel slip established.
- S10: Relaying the data established to the memory device.

The example method sequence shown in FIG. 2 may be performed in this manner or in a similar manner in a rear-wheel drive vehicle or even in a front-wheel drive vehicle. In step S01, wheel speeds are detected at every wheel of the vehicle and relayed to data processing device 16.

From this information, first an average wheel velocity of the non-driven wheels $V_{avg\_non\_driven}$ is calculated in step S02 through averaging. The translational wheel velocity results from the wheel speed detected, multiplied by the wheel radius and the factor $2\pi$.

Furthermore, in step S03, a differential velocity of the non-driven wheels $\Delta v_{non\_driven}$ is established from the wheel speeds detected:

$$\Delta v_{non\_driven} = (n_{non\_driven\_oc} - n_{non\_driven\_ic}) \cdot r_{wheel} \cdot 2\pi,$$

$n_{non\_driven\_ic/oc}$ being the wheel speeds of the non-driven wheels on the inside of the curve (ic) and on the outside of the curve (oc), respectively, and $r_{wheel}$ being the radius of the wheels.

In step S04, instantaneous yaw rate $\omega$ is established from the established average wheel velocity of the non-driven wheels and the differential velocity of the non-driven wheels, taking into consideration the vehicle geometry data stored in memory device 18, such as track width Twi and wheelbase L. This is performed, for example, via the following equations:

a.) for rear-wheel drive vehicles:

$$\omega = \frac{\Delta v_{non\_driven}}{Twi \cdot \cos(\delta)} \cdot \frac{1}{1 + c1 \cdot v^2_{avg\_non\_driven}},$$

in which $\cos(\delta) = 1 - 0.5 \cdot \delta^2$ and $$\delta = \frac{\Delta v_{non\_driven} \cdot L}{Twi \cdot v_{avg\_non\_driven}} = \frac{\Delta v_{non\_driven}}{v_{avg\_non\_driven}} \cdot c2$$

b.) for front-wheel drive vehicles:

$$\omega = \frac{v_{avg\_non\_driven}}{Twi} \cdot \frac{1}{1 + c1 \cdot v^2_{avg\_non\_driven}}.$$

In this case, c1 and c2 are constants.

In subsequent step S05, an instantaneous transverse acceleration $a_{trans}$ of the vehicle is calculated. In this case, this transverse acceleration may, for example, be determined through the detected wheel speeds, or the translational wheel velocities determinable therefrom, and the yaw rate of the vehicle. It results, for example, from:

$$a_{trans} = \omega \cdot v_{avg\_non\_driven}$$

Establishing the transverse acceleration may be omitted. The example method illustrated may then proceed without step S05.

In step S06, curve radius R of the curved road instantaneously traversed is established. This may be performed, for example, from average translational wheel velocity of the non-driven wheels $v_{avg\_non\_driven}$ and yaw rate $\omega$ already established through:

$$R = v_{avg\_non\_driven}/\omega$$

Alternatively, the curve radius may also be calculated approximately from:

$$R = \frac{v_{avg\_non\_driven} \cdot Twi}{\Delta v_{non\_driven}}$$

Therefore, if one is only interested in knowing approximated curve radius R, which may be required for establishing the geometrical slip, steps S04 and S05 in the example method illustrated may be omitted. However, since yaw rate and transverse acceleration may be obtained easily and used for subsequent regulation methods solely by detecting and processing wheel speeds, these variables are established in a an example embodiment of the method.

In step S07, a wheel slip is established for the wheels on the outside of the curve and for the wheels on the inside of the curve from the following equations:

$$\lambda_{insidecurve} = \frac{v_{frontwheel\_insidecurve} - v_{rearwheel\_insidecurve}}{v_{non\_driven\_insidecurve}},$$

$$\lambda_{outsidecurve} = \frac{v_{frontwheel\_outsidecurve} - v_{rearwheel\_outsidecurve}}{v_{non\_driven\_outsidecurve}}$$

In this case, $v_{non\_driven\_insidecurve}$ is the translational velocity of the non-driven wheels on the inside of the curve, i.e., the front wheel in a rear-wheel drive vehicle and the rear wheel in a front-wheel drive vehicle. This applies analogously for the wheels on the outside of the curve.

In step S08, geometrical slip $\lambda_{geom}$ for the wheels on the inside of the curve and the wheels on the outside of the curve is established on the basis of the following equations:

a.) For rear-wheel drive vehicles (indexing suffix RD):
a1.) For the pair of wheels on the inside of the curve (indexing suffix ic):

$$\lambda_{geom\_RD\_ic} = 1 - \frac{1}{\sqrt{1+\left(\frac{L*\omega}{v_{rearwheel\_ic}}\right)^2}}$$

or simplified as a power series:

$$\lambda_{geom\_RD\_ic} = 1 - \frac{1}{1+\frac{1}{2}\cdot\left(\frac{L*\omega}{v_{rearwheel\_ic}}\right)^2}$$

a2.) For the pair of wheels on the outside of the curve (indexing suffix oc):

$$\lambda_{geom\_RD\_oc} = 1 - \frac{1}{\sqrt{1+\left(\frac{L*\omega}{v_{rearwheel\_oc}}\right)^2}}$$

or simplified as a power series:

$$\lambda_{geom\_RD\_oc} = 1 - \frac{1}{1+\frac{1}{2}\cdot\left(\frac{L*\omega}{v_{rearwheel\_oc}}\right)^2}$$

b.) For front-wheel drive vehicles (indexing suffix FD):
b1.) For the pair of wheels on the inside of the curve (indexing suffix ic):

$$\lambda_{geom\_FD\_ic} = \sqrt{1+\left(\frac{L*\omega}{v_{rearwheel\_ic}}\right)^2} - 1$$

or simplified as a power series:

$$\lambda_{geom\_FD\_ic} = \frac{1}{2}\cdot\left(\frac{L*\omega}{v_{rearwheel\_ic}}\right)^2$$

b2.) For the pair of wheels on the outside of the curve (indexing suffix oc):

$$\lambda_{geom\_FD\_oc} = \sqrt{1+\left(\frac{L*\omega}{v_{rearwheel\_oc}}\right)^2} - 1$$

or simplified as a power series:

$$\lambda_{geom\_FD\_oc} = \frac{1}{2}\cdot\left(\frac{L*\omega}{v_{rearwheel\_oc}}\right)^2$$

The translational velocity of the front wheel or the rear wheel is indicated using $v_{frontwheel}$ and $v_{rearwheel}$, respectively. The indexing suffix "ic" or "oc" indicates which front wheel or which rear wheel velocity, that of the wheel on the inside of the curve or that of the wheel on the outside of the curve, is to be used. The equations used are described in more detail below in connection with FIG. 3.

In step S09, the values for the wheel slip of the pair of wheels on the inside of the curve and the pair of wheels on the outside of the curve established previously in step S07 are corrected by the values of the geometrical wheel slip established in step S08.

The corrected wheel slip values, the established values of the geometrical wheel slip, the established curve radius, the established transverse acceleration, the established yaw rate, the average wheel velocity of the non-driven wheels, the differential velocity of the non-driven wheels, and possibly the individually detected wheel speeds are subsequently relayed to the memory device in step S10, where they are available to the TCS for consideration during regulation of the driving response.

Figure 3:
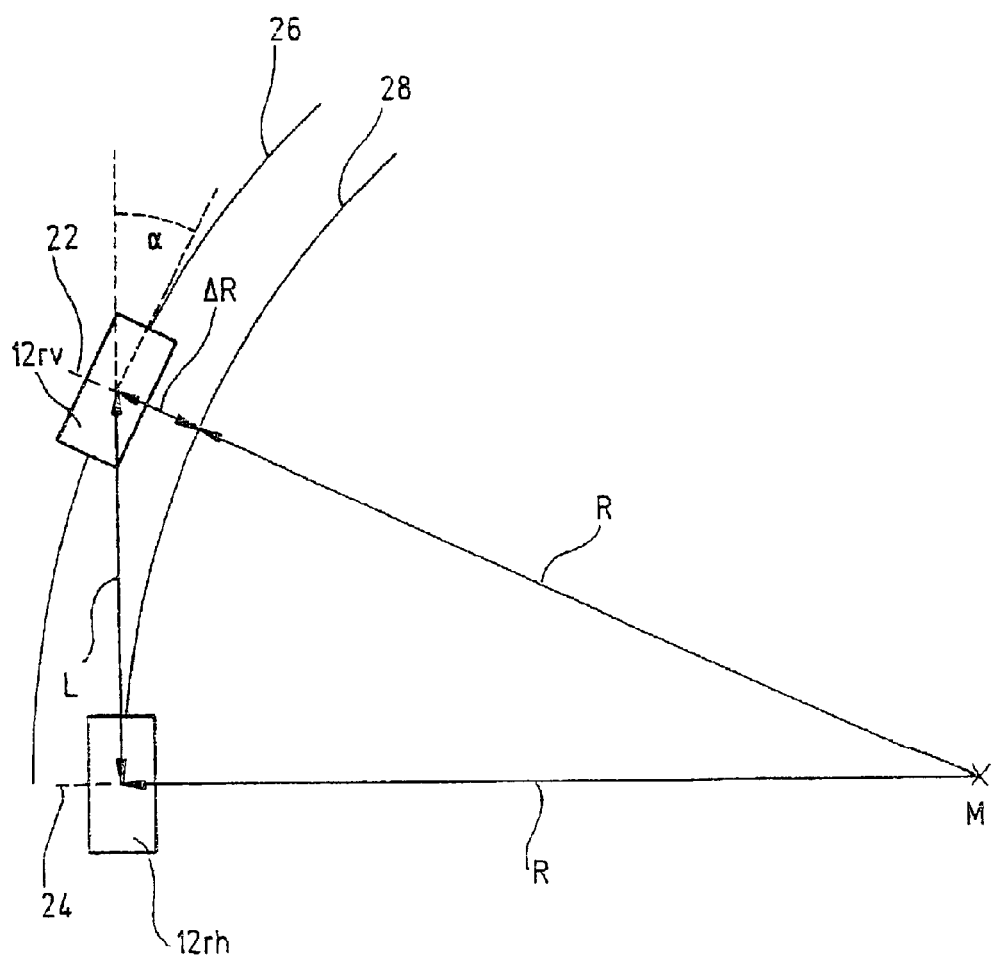
FIG. 3 shows a diagram which illustrates the geometrical ratios of two wheels arranged on the same vehicle side, left or right, during cornering.

In FIG. 3, right front wheel 12rf and right rear wheel 12rb from FIG. 1 are shown for exemplary purposes as the pair of wheels on the inside of the curve during cornering in a right hand curve. The distance of front wheel 12rf from rear wheel 12rb corresponds to wheelbase L. Front wheel 12rf is turned to the right by a steering angle $\alpha$.

The wheels obey the Ackerman condition, as may be typical in axle pivot steering, i.e., extended rotational axes 22 of right front wheel 12rf and 24 of right rear wheel 12rb intersect in instantaneous pole M on the extension of the rear axis. The vehicle turns instantaneously around this instantaneous pole M.

Since right rear wheel 12rb has a distance R from instantaneous pole M, but right front wheel 12rf has a distance R+$\Delta$R from instantaneous pole M which is greater by $\Delta$R, the wheels roll at different velocities on concentric circular trajectories 26 and 28 having instantaneous pole M as the center point.

Distance R of rear wheel 12rb from instantaneous pole M is assumed to be approximately the curve radius of the instantaneously traversed curved roadway. Alternatively, if one begins from a curve radius R' defined as a distance of instantaneous pole M from the vehicle center point (not shown), then, taking known track width Twi of the vehicle into consideration, one may determine distance R from instantaneous pole M as R=R'−½Twi for the wheels on the inside of the curve and correspondingly as R=R'+½Twi for the wheels on the outside of the curve. The curve radius may be established as previously indicated.

Due to the differing rolling velocities (the front wheel rotates faster due to the greater distance from instantaneous pole M), an error may arise in the wheel slip calculation. The wheel slip for a pair of wheels on the inside of the curve or on the outside of the curve is calculated as follows:

$$\lambda = \frac{v_{frontwheel} - v_{rearwheel}}{v_{non\_driven}}$$

The meaning of the individual formulaic symbols has already been described above. The translational wheel center point velocity for each wheel results from the product of the distance of the respective wheel from instantaneous pole M and yaw rate $\omega$.

For a front-wheel drive having a non-driven rear wheel, the following equation therefore applies:

$$\lambda_{geom\_FD} = \frac{(R+\Delta R)\cdot\omega - R\cdot\omega}{R\cdot\omega}$$

After canceling the yaw rate and calculating R+ΔR using the Pythagorean theorem, the following equation results:

$$\lambda_{geom\_FD} = \frac{\sqrt{(R^2+L^2)} - R}{R} = \sqrt{1+\left(\frac{L}{R}\right)^2} - 1$$

furthermore, if $R = V_{non\_driven}/\omega$:

$$\lambda_{geom\_FD} = \sqrt{1+\left(\frac{L\cdot\omega}{v_{non\_driven}}\right)^2} - 1 = \sqrt{1+\left(\frac{L\cdot\omega}{v_{rearwheel}}\right)^2} - 1$$

results.

For simpler calculation by electronic computing systems, the root may be expressed as a power series ($\sqrt{1+x}=1+\frac{1}{2}\cdot x$ for small x). Then, for $\lambda_{geom\_FD}$:

$$\lambda_{geom\_FD} = \frac{1}{2}\cdot\left(\frac{L\cdot\omega}{v_{rearwheel}}\right)^2$$

For a rear-wheel drive having non-driven front wheels, correspondingly:

$$\lambda_{geom\_RD} = \frac{(R+\Delta R)\cdot\omega - R\cdot\omega}{(R+\Delta R\cdot\omega)}$$

After canceling the yaw rate and calculating R+ΔR using the Pythagorean theorem:

$$\lambda_{geom\_RD} = \frac{\sqrt{(R^2+L^2)} - R}{\sqrt{(R^2+L^2)}} = 1 - \frac{1}{\sqrt{1+\left(\frac{L}{R}\right)^2}},$$

furthermore, if $R = v_{driven}/\omega$:

$$\lambda_{geom\_RD} = 1 - \frac{1}{\sqrt{1+\left(\frac{L\cdot\omega}{v_{driven}}\right)^2}} = 1 - \frac{1}{\sqrt{1+\left(\frac{L\cdot\omega}{v_{rearwheel}}\right)^2}}$$

For simpler calculation by electronic computing systems, the root again may be expressed as a power series:

$$\lambda_{geom\_RD} = 1 - \frac{1}{1+\frac{1}{2}\cdot\left(\frac{L\cdot\omega}{v_{rearwheel}}\right)^2}$$

The geometrical wheel slip for a pair of wheels on the inside of the curve may be obtained by using wheel velocities corresponding to wheels on the inside of the curve and the geometrical wheel slip for a pair of wheels on the outside of the curve may be obtained by using wheel velocities corresponding to wheels on the outside of the curve.

The preceding description of the exemplary embodiments according to the present invention is used only for illustrative purposes and not for the purpose of restricting the present invention. Various changes and modifications are possible in the framework of the present invention without leaving the scope of the present invention and its equivalents.

What is claimed is:

1. A system for at least one of controlling and regulating a driving response of a motor vehicle having at least two wheels, comprising:
   at least one sensor device for detecting wheel speeds of the at least two wheels;
   a data processing device for determining at least one motion relationship of the at least two wheels relative to one another according to detected wheel speeds, and for establishing at least one cornering motion variable of the motor vehicle according to the at least one motion relationship determined; and
   an actuator for influencing an operating state of the motor vehicle according to an actuating signal, wherein the data processing device is configured to output the actuating signal according to the at least one cornering motion variable established;
   wherein the actuator is assigned to a TCS configured to switch between traction-prioritized and driving-stability-prioritized regulation as a function of a curve radius established.

2. The system according to claim 1, wherein the data processing device is configured to determine a speed differential of the at least two wheels as the at least one motion relationship, and establishes at least one of a yaw rate, a curve radius, a transverse acceleration, a geometrical slip of the motor vehicle as the at least one cornering motion variable.

3. The system according to claim 1, wherein at least two wheels lying opposite one another in a transverse vehicle direction are each assigned a sensor device.

4. The system according to claim 1, wherein at least two wheels arranged one behind the other in a longitudinal vehicle direction are each assigned a sensor device.

5. The system according to claim 1, wherein each wheel of the motor vehicle is assigned a sensor device.

6. The system according to claim 1, wherein the at least one sensor device includes at least one of a tire sensor device and a wheel bearing sensor device.

7. The system according to claim 1, further comprising:
   a memory device for storing at least one of detected and established values, and for storing selected vehicle geometry data.

8. The system according to claim 1, wherein at least one of the data processing device and the actuator is assigned to a device for at least one of controlling and regulating the driving response of the motor vehicle.

9. The system according to claim 8, wherein the device for at least one of controlling and regulating the driving response of the motor vehicle includes one of a TCS, an antilock braking system, and an ESP system.

10. The system according to claim 8, wherein the device for at least one of controlling and regulating the driving response of the motor vehicle is configured to select at least one of control and regulation algorithms as a function of the at least one cornering motion variable established.

11. The system according to claim 1, wherein the TCS is configured to take a vehicle velocity into consideration.

12. The system according to claim 1, wherein:
   the data processing device is configured to determine a speed differential of the at least two wheels as the at least one motion relationship, and establishes at least one of a yaw rate, a curve radius, a transverse acceleration, a geometrical slip of the motor vehicle as the at least one cornering motion variable;
   one of the following is satisfied:

at least two wheels lying opposite one another in a transverse vehicle direction are each assigned a sensor device;

at least two wheels arranged one behind the other in a longitudinal vehicle direction are each assigned a sensor device; and each wheel of the motor vehicle is assigned a sensor device;

the at least one sensor device includes at least one of a tire sensor device and a wheel bearing sensor device.

13. The system according to claim 12, further comprising:

a memory device for storing at least one of detected and established values, and for storing selected vehicle geometry data.

14. The system according to claim 12, wherein at least one of the data processing device and the actuator is assigned to a device for at least one of controlling and regulating the driving response of the motor vehicle.

15. The system according to claim 14, wherein the device for at least one of controlling and regulating the driving response of the motor vehicle includes one of a TCS, an antilock braking system, and an ESP system.

16. The system according to claim 14, wherein the device for at least one of controlling and regulating the driving response of the motor vehicle is configured to select at least one of control and regulation algorithms as a function of the at least one cornering motion variable established.

17. The system according to claim 12, wherein the TCS is configured to take a vehicle velocity into consideration.

18. A method of at least one of controlling and regulating a driving response of a motor vehicle having at least two wheels, comprising:

detecting wheel speeds of the at least two wheels;

determining at least one motion relationship of the at least two wheels according to detected wheel speeds; and establishing at least one cornering motion variable of the motor vehicle according to the at least one motion relationship determined;

wherein the step of establishing the at least one cornering motion variable includes establishing at least one of a yaw rate, a curve radius, a transverse acceleration, and a geometrical slip of the motor vehicle, and wherein the geometrical slip of the motor vehicle for vehicle sides on an inside of a curve and on an outside of the curve is established with reference to a wheelbase of the motor vehicle and a distance of a wheel on the inside of the curve to an instantaneous pole of the motor vehicle.

19. The method according to claim 18, wherein the step of determining the at least one motion relationship includes determining a speed differential of the at least two wheels.

20. The method according to claim 18, wherein the yaw rate is established on a basis of a differential velocity of wheels lying essentially opposite one another in a transverse vehicle direction, a track width of the motor vehicle, a wheelbase of the motor vehicle, and wheel speeds of non-driven wheels.

21. The method according to claim 18, wherein the curve radius and the transverse acceleration are established with reference to wheel speeds of non-driven wheels and the yaw rate.

22. The method according to claim 18, further comprising:

correcting an established wheel slip by an established geometrical wheel slip during cornering.

23. The method according to claim 18, wherein the device for at least one of slip-based control and slip-based regulation includes at least one of an antilock braking system and a TCS.

24. A method of at least one of controlling and regulating a driving response of a motor vehicle having at least two wheels, comprising:

detecting wheel speeds of the at least two wheels;

determining at least one motion relationship of the at least two wheels according to detected wheel speeds; and establishing at least one cornering motion variable of the motor vehicle according to the at least one motion relationship determined;

wherein the step of establishing the at least one cornering motion variable includes establishing at least one of a yaw rate, a curve radius, a transverse acceleration, and a geometrical slip of the motor vehicle, and wherein the geometrical slip of the motor vehicle for vehicle sides on an inside of a curve and on an outside of the curve is established with reference to a wheelbase of the motor vehicle, the yaw rate of the motor vehicle, and a wheel speed of at least one wheel of one of the vehicle side on the inside of the curve and the vehicle side on the outside of the curve.

25. The method according to claim 24, wherein the step of determining the at least one motion relationship includes determining a speed differential of the at least two wheels.

26. The method according to claim 24, wherein the yaw rate is established on a basis of a differential velocity of wheels lying essentially opposite one another in a transverse vehicle direction, a track width of the motor vehicle, a wheelbase of the motor vehicle, and wheel speeds of non-driven wheels.

27. The method according to claim 24, wherein the curve radius and the transverse acceleration are established with reference to wheel speeds of non-driven wheels and the yaw rate.

28. The method according to claim 24, further comprising:

correcting an established wheel slip by an established geometrical wheel slip during cornering.

29. The method according to claim 24, wherein the device for at least one of slip-based control and slip-based regulation includes at least one of an antilock braking system and a TCS.

30. A method of at least one of controlling and regulating a driving response of a motor vehicle having at least two wheels, comprising:

detecting wheel speeds of the at least two wheels;

determining at least one motion relationship of the at least two wheels according to detected wheel speeds;

establishing at least one cornering motion variable of the motor vehicle according to the at least one motion relationship determined; and taking into consideration geometrical wheel slip of the motor vehicle for wheels on an outside of a curve during a slip threshold calculation of a device for at least one of slip-based control and slip-based regulation;

wherein the step of establishing the at least one cornering motion variable includes establishing at least one of a yaw rate, a curve radius, a transverse acceleration, and a geometrical slip of the motor vehicle.

31. The method according to claim 30, wherein the step of determining the at least one motion relationship includes determining a speed differential of the at least two wheels.

32. The method according to claim 30, wherein the yaw rate is established on a basis of a differential velocity of wheels lying essentially opposite one another in a transverse vehicle direction, a track width of the motor vehicle, a wheelbase of the motor vehicle, and wheel speeds of non-driven wheels.

33. The method according to claim 30, wherein the curve radius and the transverse acceleration are established with reference to wheel speeds of non-driven wheels and the yaw rate.

34. The method according to claim 30, further comprising:

correcting an established wheel slip by an established geometrical wheel slip during cornering.

35. The method according to claim 30, wherein the device for at least one of slip-based control and slip-based regulation includes at least one of an antilock braking system and a TCS.

* * * * *